United States Patent
Papasakellariou

(10) Patent No.: US 6,526,090 B1
(45) Date of Patent: Feb. 25, 2003

(54) DEMODULATION ELEMENT ASSIGNMENT FOR A RECEIVER CAPABLE OF SIMULTANEOUSLY DEMODULATING MULTIPLE SPREAD SPECTRUM SIGNALS

(75) Inventor: Aris Papasakellariou, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/474,035

(22) Filed: Dec. 28, 1999

(51) Int. Cl.[7] .............................................. H04B 1/707
(52) U.S. Cl. ........................ 375/136; 375/347; 375/349
(58) Field of Search ................................. 375/136, 137, 375/147, 148, 278, 284, 285, 346, 347, 349; 455/422, 436, 439, 442, 443, 444, 10, 13.4, 501, 506, 63, 65, 67.3, 135, 277.1, 277.2, 278.1, 296; 370/331, 332, 335, 441, 491

(56) References Cited

U.S. PATENT DOCUMENTS

| | | | | |
|---|---|---|---|---|
| 5,490,165 A | * | 2/1996 | Blakeney et al. | 370/335 |
| 5,654,979 A | * | 8/1997 | Levin et al. | 375/142 |
| 5,867,527 A | * | 2/1999 | Ziv et al. | 375/147 |
| 6,157,668 A | * | 12/2000 | Gilhousen et al. | 375/130 |
| 6,222,834 B1 | * | 4/2001 | Kondo | 370/342 |
| 6,373,882 B1 | * | 4/2002 | Atarius et al. | 375/148 |

* cited by examiner

*Primary Examiner*—Chi Pham
*Assistant Examiner*—Khanh Cong Tran
(74) *Attorney, Agent, or Firm*—Ronald O. Neerings; Wade James Brady, III; Frederick J. Telecky, Jr.

(57) ABSTRACT

A method (32) of operating a spread spectrum communications receiver (20). The method demodulates a current path group with a demodulator (28), wherein the current path group comprises one or more current paths and wherein the demodulating step comprises demodulating the one or more current paths with a respective one more demodulation elements. The method also determines (42) one or more survey groups at the receiver, wherein each survey group comprises of a unique combination of one or more new paths and zero or more current paths. Still further, the method determines a quality measure (52) of the current path group and (53) of one or more survey groups. Further, the method selectively assigns (62) a selected one of the survey groups to respective elements of the demodulator in place of the current path group in response to a comparison of the quality measure of the selected one of the survey groups with the quality measure of the current path group. Finally, the quality measure is responsive to a power of each path in a group and multiple forms of diversity within a group.

27 Claims, 3 Drawing Sheets

DEMODULATION ELEMENT ASSIGNMENT FOR A RECEIVER CAPABLE OF SIMULTANEOUSLY DEMODULATING MULTIPLE SPREAD SPECTRUM SIGNALS

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to spread spectrum communications systems and, more particularly, to the assignment of spread spectrum signals to demodulation elements in a communications receiver.

Wireless communications have become very prevalent in business, personal, and other applications, and as a result the technology for such communications continues to advance in various areas. One such advancement includes the use of spread spectrum communications, including that of code division multiple access ("CDMA") cellular communications. In such communications, a user station (e.g., a hand held cellular phone) communicates with a base station, where typically the base station corresponds to a "cell", or a sector of a cell, as that term is used in the art. Due to movement of the user station and the fixed location of other cells with corresponding base stations, the user station may communicate with one or more than one base station at a time in the same frequency band, and this operation is typically referred to as soft handoff. As a result and in a simple example, this dual base station, user station communication is achieved by two different "paths" of forward/reverse communication, that is, a first path from the user station to the first base station and a second path from the user station to the second base station and a first path from the first base station to the user station and a second path from the second base station to the user station.

In the actual reality of CDMA communications, and due to the wireless medium, a same transmitted communication from a base station to a user station may arrive at the user station at multiple and different times, where each different arriving signal is said to travel along a channel and arrive as a different "path." This is because the transmitted signal from the base station is reflected by objects such as the ground, mountains, buildings, and other things which it contacts. These multiple signals are referred to in the art as multiple paths or multipaths. Thus, several multipaths may eventually arrive at the user station but the channel traveled by each may cause each path to have a different phase, amplitude, and signal-to-noise ratio ("SNR"). Accordingly, for one communication between one base station and one user station, each multipath is a replica of the same user information, and each path is said have time diversity relative to other mulitpath(s) due to the difference in arrival time which causes different (uncorrelated) fading/noise characteristics for each multipath. However, as detailed later, other types of signals with the same information also may arrive at the receiver at different times and, thus, to distinguish these other signals from multipath signals then for purposes of the remainder of this document the time diversity among different multipaths is referred to as mulitpath diversity.

Although multipaths carry the same user information to the receiver they may be separately recognized by the receiver based on the timing of arrival of each multipath. More particularly and as known in the art, CDMA communications are modulated using a spreading code which consists of a series of binary pulses, and this code runs at a higher rate than the symbol data rate and determines the actual transmission bandwidth. In the current industry, each piece of CDMA signal transmitted according to this code is said to be a "chip," where each chip corresponds to an element in the CDMA code. Thus, the chip frequency defines the rate of the CDMA code. Given the use of transmission of the CDMA signal using chips, then multipaths separated in time by more than one of these chips are distinguishable at the receiver because of the low autocorrelations of CDMA codes as known in the art.

By way of further introduction, note that other types of signal diversities are known in the art, where one such diversity is referred to as base station diversity. More particularly, recall from above that a user station may over a common time period receive the same user information from two different base stations. Thus, the information received from one base station is said to have base station diversity with respect to the information received from another base station. Again, so long as these base station diverse signals are adequately separated in time or use different codes, then they are distinguishable from one another at the receiver.

In the prior art, after identifying received paths the receiving station sets forth to demodulate certain ones of the paths. More particularly, it is known in the art to include a demodulation circuit in a CDMA receiver, where such a circuit commonly includes more than one demodulation element. For example, one such type of demodulation circuit is a Rake combiner, which is given its name in the art to suggest the notion of a yard rake having "fingers" and where each finger corresponds to a different demodulation element. In contemporary systems, such a demodulation circuit may include on the order of four or six different demodulation elements, where each element is capable of concurrently demodulating a received path that is assigned to the element. Accordingly, in the prior art as different multipath or base station diversity signals are received, the receiver selects which ones to assign to its available demodulation elements. Thus, this requires a determination if any such demodulation elements are not currently in use, of if they are in use, whether there should be a reassignment whereby a newly-received path pre-empts that use to take the place of a path that was earlier assigned to a demodulation element and is currently being demodulated by that element.

The objective of the process of selecting certain paths for demodulation is typically to optimize a performance parameter such as the frame error rate (FER) or the symbol error rate (SER), or to enhance the reliability of the communication link by reducing the probability of an outage. As an example, a method for demodulation element assignment in a CDMA communications system is disclosed in U.S. Pat. No. 5,490,165 entitled "DEMODULATION ELEMENT ASSIGNMENT IN A SYSTEM CAPABLE OF RECEIVING MULTIPLE SIGNALS", issued Feb. 6, 1996 (the '165 patent). The '165 patent provides different demodulation assignment methods based on whether the receiver is the user station or the base station, each of which is separately discussed below.

In the '165 patent, the demodulation element assignment method for the user station emphasizes base station diversity. More particularly, the '165 patent approach requires that the user station always has a demodulation element assigned to at least one path originating from the signal transmitted by each different base station. Thus, if the user station receives a path from a new base station (i.e., one which is not currently being demodulated by the user station), then the user station unconditionally assigns a demodulation element to the received path. This assumes that the user station communicates with more than one base station at that particular time instant, that is, that the user station is in soft handoff. If the user station is not in soft handoff or if it has a demodulation element assigned to each base station participating in soft handoff, the remaining unassigned demodulation elements are assigned to paths having the largest SNR (or signal-to-interference ratio (SIR)). Also, as long as every different base station communicating with the user station has at least one demodulation element assigned, all but the strongest path (i.e., largest SNR or SIR) from each base station may be dismissed and the demodulation elements be reassigned to paths with the largest SNRs.

Having introduced soft handoff above, a few other prior art observations relating to soft handoff are now noted. The assignment of a first path from a new base station to a demodulation element of a user station initiates the soft handoff process. This is typically a decision made by the system controller. The user station is instructed through the base station currently supporting the communication that a new base station begins transmission to the user station. The user station may then assign one or more paths from the new base station to demodulation elements.

Returning to the '165 patent, the demodulation element assignment method for the base station assumes that the only type of diversity for incoming paths is multipath diversity. Given this assumption, for each signal received by the base station from a user station the demodulation elements assignments are entirely based on the received path SNR. Thus, the paths with the larger SNRs are assigned to the demodulation elements. Also, at both the user station and the base station a typical hysteresis method as commonly known in the literature was assumed.

While the '165 patent provides methods of demodulation element assignment for either a base station or a user station, the present inventor has recognized that it has various drawbacks. As one such drawback, for the user station the unconditional assignment of the '165 patent based on base station diversity (i.e., to an arriving signal from a new base station) may in some instances cause a less than optimal use of the demodulator. For example, the demodulation element assigned to the second base station path is occupied and not available for demodulating paths from the first base station, even though those paths may have a substantially greater SNR or other reason rendering them more beneficial to the receiver as opposed to a path from the second base station.

As another drawback, the assignment method of the '165 patent provides for at most only one type of diversity for the user station (i.e., base station diversity), and does not at all consider diversity for signals received by the base station (i.e., it only evaluates SNR). However, as has been recognized in the art in areas other than demodulation, numerous other types of diversity also exist in CDMA signals. Thus, due to these other diversity types, again there is a chance for different paths to be received by a same station during a same time period where the signals include replica user information but where certain characteristics of the path carrying the information differ in one or more respects from other paths received during the same time period. For example, often a base station uses multiple antennas where each antenna transmits the same signal to the user station, thereby causing multiple paths to arrive at the user station. Another source of multiple signals may occur when the user station discriminates arriving signal paths using more than one antenna (i.e., at least one path per receiving antenna). Still other types of diversity are known in the art, such as angle diversity (e.g., paths arriving along different electromagnetic planes) and code diversity (signals transmitted with different spreading codes), and still others may be ascertained by one skilled in the art. Lastly, note also that some or all of the above sources of multiple paths also may appear in the reverse communication link, that is, for the signal transmitted by a user station and received by a base station. Each of these additional types of diversity is not expressly considered in the method of the '165 patent; moreover, these different diversities may or may not predictably affect SNR and, thus, they are not necessarily implicitly considered in the method of the '165 patent as well. In the present inventive embodiments, however, and as explored below, the present inventor has recognized that some or all of these diversity types may prove useful in the process of selecting certain paths for demodulation, as is achieved by the preferred embodiments discussed below.

BRIEF SUMMARY OF THE INVENTION

In the preferred embodiment, there is a method of operating a spread spectrum communications receiver. The method demodulates a current path group with a demodulator, wherein the current path group comprises one or more current paths and wherein the demodulating step comprises demodulating the one or more current paths with a respective one or more demodulation elements. The method also determines one or more new path groups (survey groups) at the receiver, wherein each survey group comprises one or more new paths and zero or more current paths. Still further, the method determines a quality measure of the current path group and of a plurality of survey groups. Each of the survey groups comprises a different combination of one or more new paths and zero or more current paths. Further, the method selectively assigns a selected one of the survey groups to respective elements of the demodulator in place of the current path group in response to a comparison of the quality measure of the selected one of the survey groups with the quality measure of the current path group when the survey group has a larger quality measure than the current group. The selected survey group also has the largest quality measure among all survey groups. Finally, the quality measure is responsive to the power or signal-to-noise ratio of each path in a group and multiple forms of diversity within a group. Other circuits, systems, and methods are also disclosed and claimed.

DETAILED DESCRIPTION OF THE INVENTION

Figure 1:
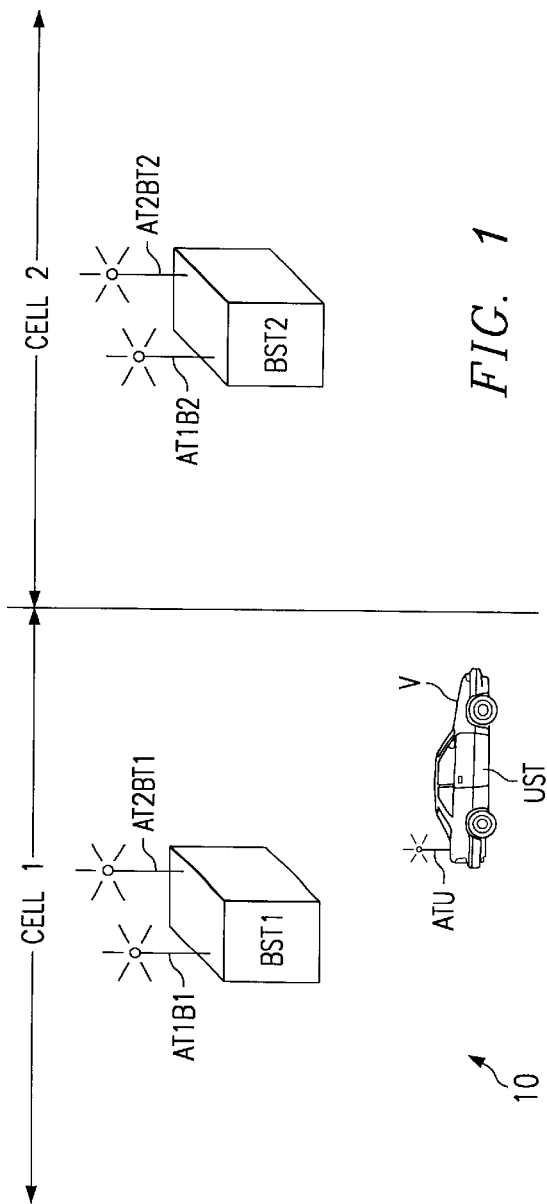
FIG. 1 illustrates a diagram of a cellular communications example with two dual-antenna base stations and a single-antenna mobile user station.

FIG. 1 illustrates a diagram of a cellular communications system 10 by way of a contemporary example in which the preferred embodiments operate. Within system 10 is shown two base stations BST1 and BST2, each of which operates generally as known in the CDMA art. Further, each base station BST1 and BST2 includes two antennas from which each may transmit or receive CDMA signals. For purposes of convention, each antenna combines the abbreviation "AT" followed by a number to distinguish it at its own base station, and followed by a base station identifier. For example, base station BST1 includes a first antenna AT1B1 and a second antenna AT2B1. Similarly, base station BST2 includes a first antenna AT1B2 and a second antenna AT2B2. The general area of intended reach of each base station defines a corresponding cell; thus, base station BST1 is intended to generally communicate with other cellular devices within Cell 1 while base station BST2 is intended to generally communicate with other cellular devices within Cell 2. Of course, some overlap between the communication reach of Cells 1 and 2 exists by design to support continuous communications should a communication station move from one cell to the other. Indeed, further in this regard, system 10 also includes a user station UST, which is shown in connection with a vehicle V to demonstrate that user station UST is mobile. In addition, by way of example user station UST includes a single antenna ATU for both transmitting and receiving cellular communications.

In many respects, system 10 may operate according to known general techniques for various types of cellular or other spread spectrum communications, including CDMA communications. Such general techniques are known in the art and include the commencement of a call from user station UST and the handling of that call by either or both of base stations BST1 and BST2. In addition, note also that the prior art includes a technique known as soft handoff, which is further enhanced according to the preferred embodiments described later. At this point by way of introduction, note that soft handoff typically occurs as user station UST is located in an area that is near the common border between Cells 1 and 2. For example, assume that user station UST is progressing from a location closer to base station BST1 to a point closer to base station BST2. Base stations BST1 and BST2 detect this change in relative physical location by processing signal communications from user station UST. Alternatively, user station UST may identify a sufficiently strong signal from the new base station BST2 and inform base station BST1 which currently supports the communication with user stat thus becomes a candidate for soft handoff. The system controller may decide to initiate the soft handoff process based on the available resources at base station BST2 and other system conditions. Initially during this time, both base stations BST1 and BST2 are communicating signals with the same information in them to user station UST, and user station UST properly identifies and demodulates the signals so that the user of user station UST perceives receipt of only a single information data stream. As user station continues on its path, however, the controller may issue appropriate control so that one base station (e.g., BST1) is eventually controlled to drop (i.e., discontinue) its communications with user station UST while the other base station (e.g., BST2) is controlled to continue its communications with user station UST; this process is performed in a manner that preferably is unnoticeable to user station UST. In this manner, therefore, one base station "hands off" the communication to the other base station.

Figure 2:
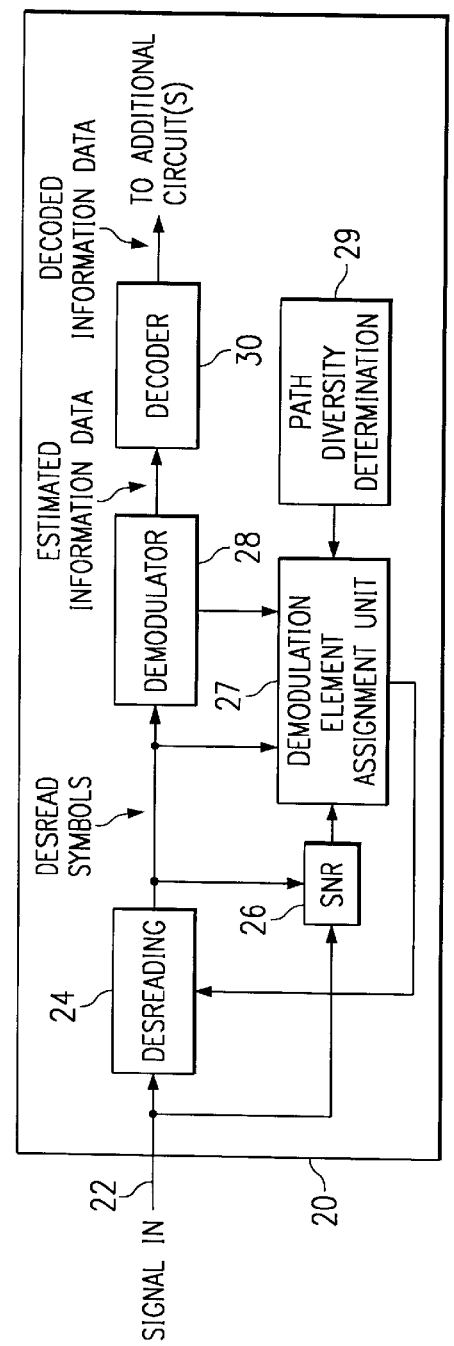
FIG. 2 illustrates a functional block diagram of a receiver according to the preferred embodiment

FIG. 2 illustrates a block diagram of a receiver 20 according to the preferred embodiment, which is now introduced generally in terms of its structure and operation. Before proceeding, it is noted that the blocks of FIG. 2 and steps in a later operational Figure are shown and described relative to the function of each, where the actual circuitry, software, and/or firmware used to achieve such functionality may be implemented using a digital signal processor or in various other manners as may be ascertained by one skilled in the art. Moreover, receiver 20 may exist in either or both user stations and base stations and, thus, may be used in all of stations BST1, BST2, and UST of FIG. 1. Finally, it is noted with respect to receiver 20 that the block diagram of FIG. 2 is merely an exemplary setup for functionally performing the inventive method described later, and accordingly the actual receiver may have these blocks rearranged differently and the changes can be made by one skilled in the art. Indeed, while the following discussion is functionally accurate in the sense that it is broken down, the overall function may be implemented using different block forms or by separating the functions described below into different components of receiver 20.

Turning to receiver 20, it receives a CDMA signal at an input 22, and that input is connected to a despreading block 24. Despreading block 24 operates according to known principles, such as by multiplying the CDMA signal times the CDMA code for receiver 20, thereby producing a despread symbol stream at its output at the symbol rate. More particularly, in the preferred embodiment despreading block 24 (or some other block if desired) includes what is referred to in the art as a searcher (not separately shown). The searcher operates to initially determine the number of distinguishable paths, which typically are paths separated in time by more than a one-chip interval or have different CDMA codes, received for a given communication. In response, despreading block 24 establishes a buffer for each of these paths after despreading. The output of despreading block 24 is connected to an SNR measurement block 26, a demodulation element assignment block 27, and a demodulator 28.

SNR measurement block 26 is operable, as its name suggests, to measure the SNR (or signal-to-interference ratio (SIR)) of the output of despreading block 24 and to provide this measurement to demodulation element assignment block 27, for reasons detailed later. Further in this regard, note that SNR measurement block 26 also receives an input from input 22. In response to its two inputs, block 26 determines noise power N from the signal before it is despread by despreading block 24, and block 26 determines signal power P after despreading by block 24. From these two measurements, the SNR is determined as the ratio of P/N. In any event, however, it should be understood that SNR measurements are common in wireless receivers for several reasons and, therefore, assuming such functionality already exists in receiver 20 it also may be used to measure SNR at the output of despreading block 24 (as well as in other locations).

Demodulation element assignment block 27 receives all the despread signals and determines which ones of those signals should be assigned to demodulator 28, that is, it "assigns" certain ones of the despread elements of demodulator 28. More particularly, an output of block 27 indicates this determination to depsreading block 24 so that it may connect only those selected signals to demodulator 28; thus, an output of block 24 is shown generally connected to an input of demodulator 28, with it therefore understood that selected signals are coupled from block 24 to demodulator 28 while signals not selected do not pass to demodulator 28. Further, in response to receipt of the selected signals, demodulator 28 demodulates only those selected signals using its corresponding demodulation elements. The preferred embodiment for the selection of signals by demodulation element assignment block 27 is described later in connection with FIG. 3. Also in the later discussion are explanations of the inputs to block 27 from SNR measurement block 26, demodulator 28, and path diversity determination block 29.. At this point, note that demodulator 28 in the preferred embodiment includes an integer number M of demodulation elements, where each element is operable to demodulate a respective path once it is assigned to the element. For example, such a demodulator may be constructed using a Rake combiner, which, as described in the earlier Background Of The Invention section of this document, has demodulation elements known in the art as fingers. In any event, demodulator 28 combines the results of each of the demodulated elements and, in doing so, it outputs a single symbol stream (not a "path"). The single stream is the result of the operation of demodulator 28 which combines each of the element signals according to various techniques, such as what is typically is referred to in the art as maximal ratio combining. In one such approach, these operations may be implemented using an iterative technique described in U.S. patent application 09/452,066, entitled "Channel Estimation For Communication System Using Weighted Estimates Based On Pilot Data and Information Data," filed Nov. 30, 1999, and hereby incorporated herein by reference. In any event, the single symbol stream provided by demodulator 28 is an estimate of the transmitted information data (also referred to as "soft data"). The single symbol stream output of demodulator 28 is connected to a decoder 30.

Decoder circuit 30 may include a deinterleaver, a Viterbi decoder or a turbo decoder, or other appropriate decoding schemes as known in the art Decoder 30 further decodes the soft data symbols, typically operating with respect to certain error correcting codes, and outputs a resulting stream of decoded symbols. Indeed, note that the probability of error for data input to decoder 30 is far greater than that after processing and output by decoder 30. For example, under current standards, the probability of error in the output of decoder 30 may be between $10^{-3}$ and $10^{-6}$. Finally, the decoded symbol stream output by decoder 30 may be received and processed by additional circuitry in receiver 20, although such circuitry is not shown in FIG. 2 so as to simplify the present illustration and discussion.

Figure 3A:
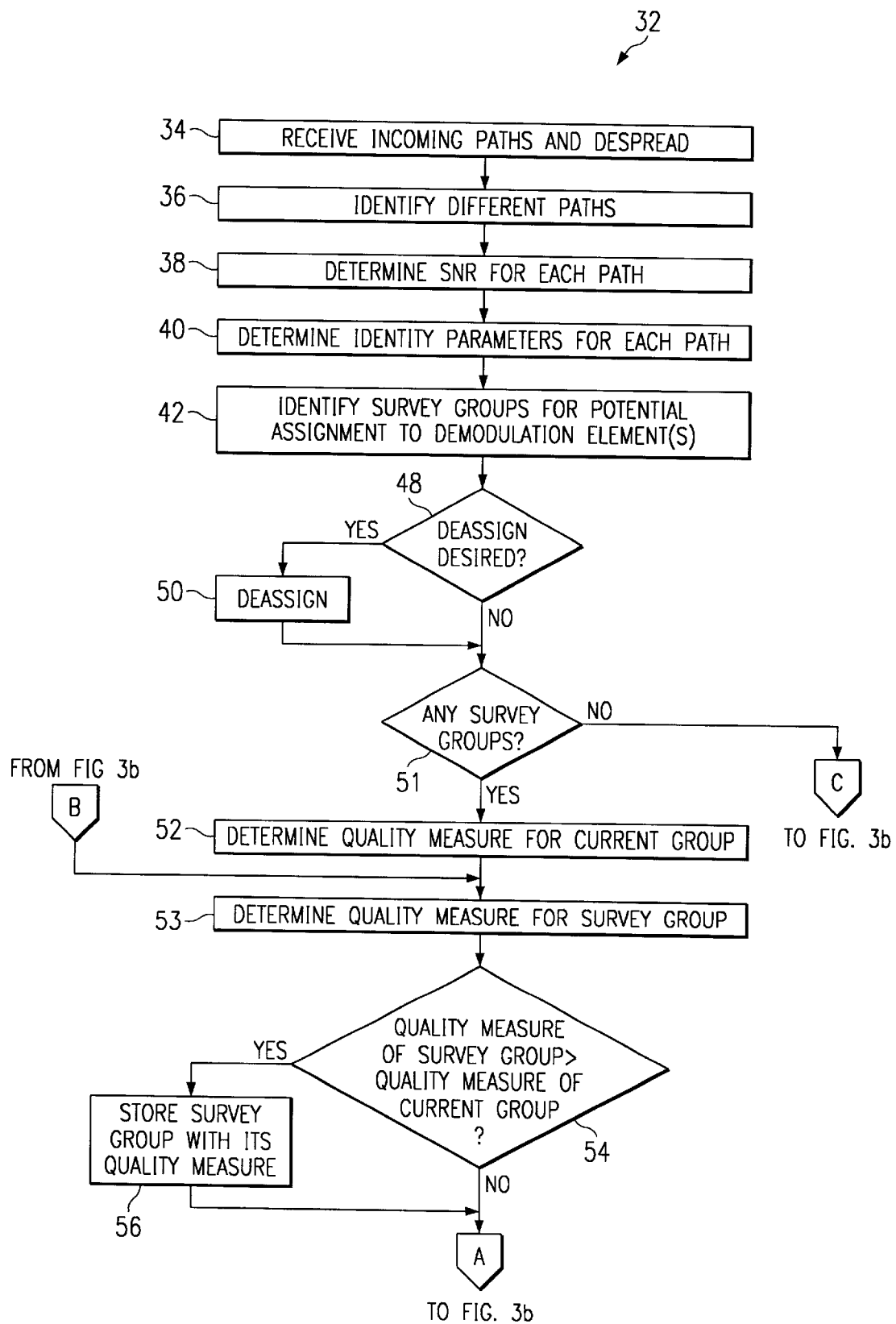
FIGS. 3a and 3b illustrate a preferred method of operation of the receiver of FIG. 2 for purposes of assigning paths to the receiver's demodulator elements.
Figure 3B:
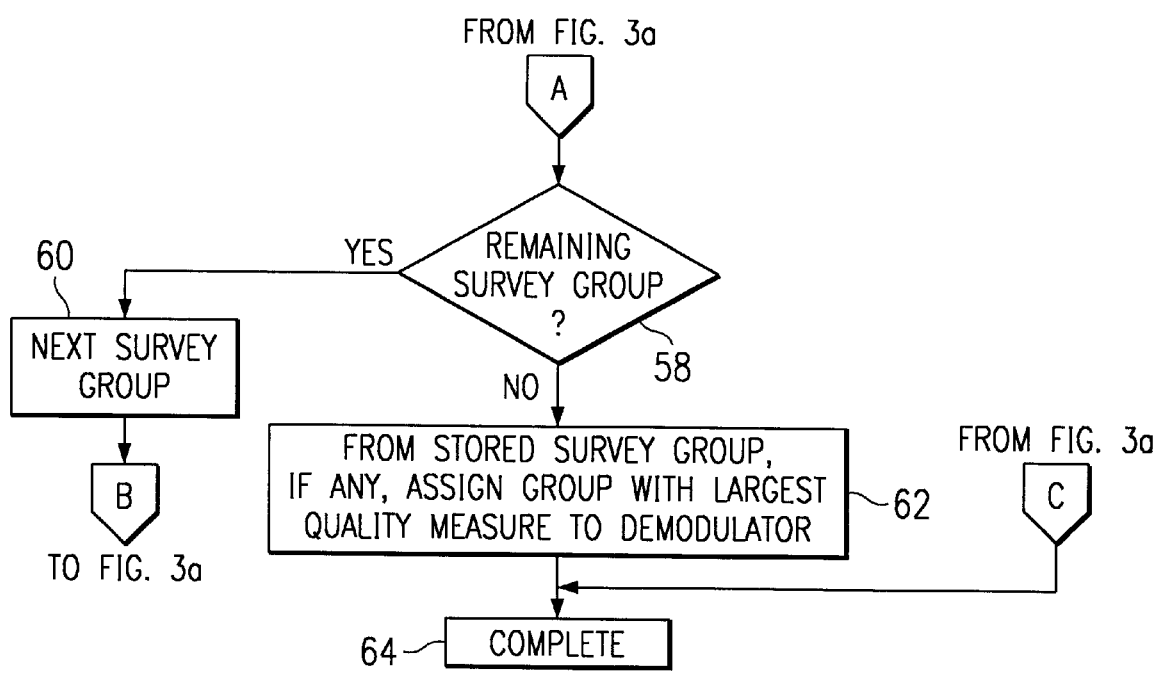

FIGS. 3a and 3b illustrate a method 32 of operation of demodulation element assignment block 27 in connection with the receipt of paths and assignment of selected ones of those paths to demodulation elements. Before proceeding, note that method 32 may be achieved using additional control and/or state machine circuitry in receiver 20 such as within demodulation element assignment block 27, where one skilled in the art may readily ascertain various fashions for implementing the steps now described. Turning to method 32 in general, for a number of signals received by receiver 20, it assigns one or more of those signals to the M demodulation elements in demodulator 28. To further demonstrate this operation as discussed in detailed below, an example is now presented using the context of FIG. 1. For this example, let the following be assumed. First, assume that receiver 20 is part of user station UST, and that its demodulator 28 includes two demodulation elements (i.e., the integer M equals 2). Second, assume that at a given instance, each base station BST1 and BST2 is transmitting a signal to user station UST by each of its antennas. Thus, with respect to base station BS1 antenna AT1B1 sends a signal to user station UST while antenna AT2B1 also sends a signal to user station UST, and likewise for the two antennas of base station BST2. Accordingly, a total of four signals are transmitted to user station UST1 under these assumptions. Finally, however, assume that for each transmitted signal, it creates two multipaths which arrive at user station UST with sufficient time disparity to be identified from one another. Thus, from all of the above assumptions, a total of eight paths are received by user station UST, and these different paths are abbreviated as shown in the following Table 1, using the convention (x, y,z), where x is the sending base station y is the base antenna, and z is a number to distinguish each of the two multipaths sent from a given antenna.

TABLE 1

| Path number | Path |
| --- | --- |
| 1 | (BST1, AT1B1, 1) |
| 2 | (BST1, AT1B1, 2) |
| 3 | (BST1, AT2B1, 1) |
| 4 | (BST1, AT2B1, 2) |
| 5 | (BST2, AT1B2, 1) |
| 6 | (BST2, AT1B2, 2) |
| 7 | (BST2, AT2B2, 1) |
| 8 | (BST2, AT2B2, 2) |

Looking now to the specific steps of method 32, method 32 starts with a step 34 where one or more signals (or "paths") are received at input 22 and pass to despreading block 24. Thus, for the present example, assume that each of the eight paths in Table 1 are received in this manner. In step 34, despreading block 24 despreads each incoming path as known in the art. For example, despreading block 24 uses a locally generated replica CDMA code synchronized with the arrival time of a received path and a correlator to separate the desired path from other signals and paths. A CDMA correlator can be thought of as a matched filter, that is, it responds only to signals that are encoded with a CDMA code that matches its own code. Thus the CDMA correlator can be "tuned" to different signals simply by changing its local code. The correlator does not respond to man made, natural or artificial noise or interference. It responds only to spread spectrum signals with identical matched signal characteristics and encoded with the identical CDMA code. With correct timing and other appropriate receiver setup, the correlation result produces the original transmitted signal, affected by the channel and interference/noise, while the remaining interfering signals will appear noise-like. This is a direct consequence of the pseudo-noise property of CDMA codes. Next, method 32 continues to step 36.

In step 36, despreading block 24 identifies the different paths to the extent it is able to do so. More particularly, recall that despreading block 24 (or some other block if desired) includes a searcher which operates initially to determine the number of distinguishable paths, which typically are paths separated in time by more than a one-chip interval or have different CDMA codes, received for a given communication. In response, despreading block 24 establishes a buffer for each of these paths after despreading. Thus, for the sake of the present example, assume that the searcher properly identifies each of the eight paths in Table 1, and each such path is stored in a respective buffer. Next, method 32 continues to step 38.

In step 38, SNR measurement block measures the SNR (or SIR) of each of the paths as output by despreading block 24. These SNR values are used by demodulation element assignment block 27 as detailed below; thus, in the preferred embodiment, each measured value is stored for purposes of further analysis, as further appreciated by the remaining discussion. Next, method 32 continues to step 40.

In step 40, demodulation element assignment block 27 determines for each path any identity parameters of the path, that is, those parameters that relate to a type of diversity for the path. Note that these identity parameters will identify the base station (thereby detecting base station diversity) and any multipaths (thereby detecting multipath diversity) for each signal, as in the prior art. For example in this regard, for path 1 in Table 1, step 40 determines for these two identity parameters that the path is from base station BST1 and is a first multipath, while for path 2 in Table 1 step 40 determines for these two identity parameters that the path is from base station BST1 and is a second multipath. However, beyond these determinations, step 40 also determines other identity parameters that relate to diversity types, that is, the diversity determination is not limited to base station diversity and multipath diversity. For example, such other identity parameters that relate to diversity include, but are not limited to, those diversity examples discussed in the Background Of The Invention section of this document; thus, these examples include identifying a specific transmitter antenna (i.e., transmitter antenna diversity where a transmitter has more that one antenna), identifying a specific receiver antenna receiver (i.e., receiver antenna diversity where a receiver has more that one antenna), identifying an angle of signal receipt (i.e., angle diversity where signals may arrive along different electromagnetic planes), and identifying a spreading code (i.e., code diversity where signals are transmitted with different spreading codes). Still other identity parameters that may be different for some or all of the transmitted signals include different frequencies (i.e., frequency diversity), as well as the effectiveness of coding and interleaving. Finally, note that step 40 is achieved given the various inputs and functions described in this document relative to block 27. For example, it was earlier mentioned that a searcher can identify multipath and base station diversity, and this type of information is thus made available to block 27. As another example, path diversity determination block 29 is shown generally to represent other types of diversity (e.g., receiver antenna diversity, transmitter antenna diversity, angle diversity, and so forth) that may be determined by other circuits and/or software.

To further demonstrate the operation of step 40, note that as applied to the paths of Table 1, then step 40 would determine each of the values of x (i.e., base station diversity), y (i.e., base station antenna diversity), and z (multipath diversity), for those paths. However, if the paths of Table 1 had one or more additional diversity parameters, then step 40 would identify those as well. Note further in this regard that detection of an identity parameter will depend on the type of diversity, and once a type of diversity is chosen to be included in this step then one skilled in the art may readily ascertain how that diversity type is identified. As one example of identity parameter detection, multipath diversity is detected by the searcher which identifies those paths by scanning over a window of time offsets around a nominal time. More particularly, the difference of arrival times for multipaths originating from the same transmitter is with practical certainty within well known bounds depending on the communications environment (indoor, outdoor, etc.). Thus, knowing the nominal arrival time or an indirect reference of the arrival time, the searcher element can identify the multipaths by correlating with a replica of the expected received signal at each possible time offset and using the result to make a decision regarding a path existence at that particular offset. In this manner, multipaths can be identified, as may be paths from different transmitters (e.g. different base stations). As another example of identity parameter detection, for paths received at different frequencies (frequency diversity) or at different angles (spatial diversity), multiple antennas can be used at the receiver to identify and separate them. As yet another example of identity parameter detection, paths corresponding to signals transmitted using different spread spectrum codes (code diversity), which are not just different offsets of the same code, can be identified using different spread spectrum codes for their demodulation at the receiver. In any event, once the identity parameters are identified, method 32 continues to step 42.

In step 42, demodulation element assignment block 27 identifies, given the paths from step 36, all possible "survey groups" of those paths for possible assignment to demodulation elements. To appreciate the intent of this terminology, note that ultimately after step 42 and subsequent steps there is a chance that the preferred embodiment assigns one or more of the paths identified in step 36 to a corresponding one or more of the demodulation elements for demodulation by those elements. Thus, the survey groups are groups of paths that are considered for assignment such that at a given time one of those groups may be assigned to the demodulation element(s). Thus, the term "survey" is chosen because for each "group," each path in the group is being considered or "surveyed" for possible assignment to a demodulation element. Further, each "group" consists of a set having paths identified in step 36, where for each such group its number of paths is equal to the number M of demodulation elements. The number of unassigned paths in each survey group equals the number of allowable demodulation element reassignments while the remaining paths in each group are ones that are already assigned. The combination of the paths in each group is unique from any other combination of available paths (i.e., from any other survey group). Finally, as detailed below, the total number of groups depends on the maximum allowable number of demodulation element reassignments each time.

To further define step 42, let the number of demodulation elements available for assignment be represented as K. Further, to define the survey groups, K must first be known because this number defines the maximum number of unassigned paths that may be included in each survey group, assuming that all available demodulation elements are allowed to be reassigned at one time. This in turn defines the total number of survey groups by specifying the allowable unassigned and assigned path combinations. Notice that the total number of paths in each survey group is equal to the total number of demodulation elements M. For example, if eight paths are identified in step 36, and only two demodulation elements are available to which respective paths may be assigned (i.e., K=2), then each survey group consists of only up to two unassigned paths because it is only that number of paths which may be reassigned; thus, in that case, each survey group has no more than two unassigned paths, and indeed some of the groups must have fewer than K unassigned paths as will be evident later. Similarly, if three demodulation elements were available for assignment, then each survey group would include no more than three unassigned paths, and so forth. In general, if only K out of the total of M demodulation elements are allowed reassignment at one time (K<=M), then the survey groups contain up to K paths that are different from the already assigned paths and contain at least M−K paths that are already assigned. Lastly, recall in the example as applied to FIG. 1 it is stated that receiver 20 includes a total of two demodulation elements (i.e., M=2). For the remainder of the current example, it is assumed that both of these demodulation elements are available for assignment (i.e., K=M=2). However, as discussed later, in some instances K may be less than M. In these cases, each survey group comprising of a total of M paths will include no more than K unassigned paths.

To further demonstrate the operation of step 42 and the notion of survey groups, such groups are now derived for the example of Table 1. Further, assume for the present example that when a step 42 identification analysis takes place, all M demodulation elements are to receive respective paths to demodulate. Given this assumption and for the FIG. 1 example where M equals two demodulation elements, each survey group includes either one or two different unassigned paths to be assigned to one or two of the available demodulation elements, respectively. Moreover, recall it is stated above that for each survey groups its path or paths are unique from any other combination of available paths. Given the preceding observations, recall that Table 1 includes a total of eight different paths (i.e., arising from two different types of base station diversity, two different types of base station antenna diversity, and two different multipath diversities). Thus, the total number C of different combinations of these N (i.e., N=8) different paths, when put in survey groups having only two paths each corresponding to the two available demodulation elements, may be represented by the following Equation 1:

$$C = \frac{N!}{M! \times (N-M)!} = \frac{8!}{2! \times (8-2)!} = \frac{8!}{2! \times (6)!} = \frac{8 \times 7}{2 \times 1} = 28 \quad \text{Equation 1}$$

From Equation 1, therefore, it is known that the example of FIG. 1 gives rise to a total of 28 different survey groups identified by step 42. These 28 survey groups are numbered and shown by their Table 1 path numbers in the following Table 2:

TABLE 2

| Survey Group No. | Path Nos. |
|---|---|
| 1 | 1, 2 |
| 2 | 1, 3 |
| 3 | 1, 4 |
| 4 | 1, 5 |

TABLE 2-continued

| Survey Group No. | Path Nos. |
|---|---|
| 5 | 1, 6 |
| 6 | 1, 7 |
| 7 | 1, 8 |
| 8 | 2, 3 |
| 9 | 2, 4 |
| 10 | 2, 5 |
| 11 | 2, 6 |
| 12 | 2, 7 |
| 13 | 2, 8 |
| 14 | 3, 4 |
| 15 | 3, 5 |
| 16 | 3, 6 |
| 17 | 3, 7 |
| 18 | 3, 8 |
| 19 | 4, 5 |
| 20 | 4, 6 |
| 21 | 4, 7 |
| 22 | 4, 8 |
| 23 | 5, 6 |
| 24 | 5, 7 |
| 25 | 5, 8 |
| 26 | 6, 7 |
| 27 | 6, 8 |
| 28 | 7, 8 |

Table 2, therefore depicts each different combination of paths in different survey groups, where each group consists of two paths possibly to be considered for assignment to the available demodulation elements. For example, looking at survey group number 1, it illustrates that one survey group includes paths 1 and 2, where if this group number 1 is ultimately selected for assignment to the two demodulation elements, then paths 1 and 2 will be demodulated by those elements. In addition, the actual groups considered for reassignment out of the total 28 groups depends on various factors. For example, one of the survey groups contains only the paths that are already assigned, and this group is not considered in the reassignment process. As another example, some of the groups contain one path that is already assigned. If only one demodulation element reassignment is allowed at one time, survey groups containing only one path that is not already assigned are the only ones considered; the remaining survey groups are not considered.

Table 3 below shows the same survey group information as Table 2, but instead of using the path numbers it shows the actual path abbreviations taken from Table 1:

TABLE 3

| Survey Group No. | Path Nos. | Survey Group No. | Path Nos. |
|---|---|---|---|
| 1 | (BST1, AT1B1, 1), (BST1, AT1B1, 2) | 15 | (BST1, AT2B1, 1), (BST2, AT1B2, 1) |
| 2 | (BST1, AT1B1, 1), (BST1, AT2B1, 1) | 16 | (BST1, AT2B1, 1), (BST2, AT1B2, 2) |
| 3 | (BST1, AT1B1, 1), (BST1, AT2B1, 2) | 17 | (BST1, AT2B1, 1), (BST2, AT2B2, 1) |
| 4 | (BST1, AT1B1, 1), (BST2, AT1B2, 1) | 18 | (BST1, AT2B1, 1), (BST2, AT2B2, 2) |
| 5 | (BST1, AT1B1, 1), (BST2, AT1B2, 2) | 19 | (BST1, AT2B1, 2), (BST2, AT1B2, 1) |
| 6 | (BST1, AT1B1, 1), (BST2, AT2B2, 1) | 20 | (BST1, AT2B1, 2), (BST2, AT1B2, 2) |
| 7 | (BST1, AT1B1, 1), (BST2, AT2B2, 2) | 21 | (BST1, AT2B1, 2), (BST2, AT2B2, 1) |
| 8 | (BST1, AT1B1, 2), (BST1, AT2B1, 1) | 22 | (BST1, AT2B1, 2), (BST2, AT2B2, 2) |
| 9 | (BST1, AT1B1, 2), (BST1, AT2B1, 2) | 23 | (BST2, AT1B2, 1), (BST2, AT1B2, 2) |
| 10 | (BST1, AT1B1, 2), (BST2, AT1B2, 1) | 24 | (BST2, AT1B2, 1), (BST2, AT2B2, 1) |
| 11 | (BST1, AT1B1, 2), (BST2, AT1B2, 2) | 25 | (BST2, AT1B2, 1), (BST2, AT2B2, 2) |
| 12 | (BST1, AT1B1, 2), (BST2, AT2B2, 1) | 26 | (BST2, AT1B2, 2), (BST2, AT2B2, 1) |
| 13 | (BST1, AT1B1, 2), (BST2, AT2B2, 2) | 27 | (BST2, AT1B2, 2), (BST2, AT2B2, 2) |
| 14 | (BST1, AT2B1, 1), (BST1, AT2B1, 2) | 28 | (BST2, AT2B2, 1), (BST2, AT2B2, 2) |

Table 3, therefore, again depicts each different combination of paths in the different survey groups. Once more looking by way of example at survey group number 1, then it illustrates that a survey group number 1 includes (BST1, AT1B1, 1) and (BST1, AT1B1, 2) (i.e., paths 1 and 2 from Table 1). Accordingly, if survey group number 1 is ultimately selected for assignment to the two demodulation elements, then one of the two demodulation elements will demodulate a first multipath from the first antenna of base station BST1 (i.e., (BST1, AT1B1, 1)), while the other of the two demodulation elements will demodulate a second multipath from the first antenna of base station BST1 (i.e., (BST1, AT1B1, 2)).

In one embodiment and for reasons more clear later, step 42 also places certain survey groups in a particular order. More particularly, this occurs for those survey groups that include paths that differ only in multipath diversity, that is, there is at least one path in each group that has the same identity parameters with at least one path in another group. For example, looking to Table 3, survey groups 2 and 8 provide an example of this special case. More particularly, the second path in survey groups 2 and 8 is the same while the first paths are just multipaths having the same forms of diversity (other than time diversity). For purposes of this document, such survey groups are referred to as multipath-diversity-only ("MDO") survey groups. In any case, for MDO survey groups, and recalling that the SNR for each path was measured in step 38, then step 40 puts the groups belonging to a same set of MDO survey groups in descending SNR order. Again returning to survey groups 2 and 8 by way of example, and assuming that the path (BST1, AT1B1, 1) has a higher SNR than the path (BST1, AT1B1, 2), survey group 8 need not be examined since survey group 2 will always be preferred for reassignment over survey group 8. Other examples of MDO survey groups in Table 3 include survey groups 3 and 9, survey groups 4 and 10, survey groups 5 and 11, and so on.

Having determined all possible survey groups and the identity parameters giving rise to diversity among those groups, steps 48 through 58 now determine whether there is benefit in assigning one of the survey groups to the demodulation element(s). By way of introduction to this methodology, this benefit analysis considers whether there would be a sufficient improvement in making such an assignment as compared to the current status quo of the demodulation elements. For example, in a demodulator having M demodulation elements, and if at a given time one or more of those elements are not assigned to any paths, then no demodulation is taking place which necessarily is not an efficient use of the unassigned demodulation elements; accordingly, by definition for this case any assignment of paths to the unassigned demodulation elements will result in a net improvement in use of the demodulator. In another example, however, all of the M demodulation elements will already be assigned to, and will be currently demodulating, respective paths. Thus, in this instance, the benefit analysis of the preferred embodiment effectively performs what may be referred to as a "what if" analysis, that is, the preferred embodiment determines whether there would be a communications benefit if a survey group containing one or more paths not currently assigned (hereafter referred to as a "survey" group) was assigned to one or more demodulation elements in place of a group of one or more paths that are currently-assigned to the demodulator (hereafter, the "current" group). Thus, in a general sense, if demodulation of the survey group sufficiently improves the frame error rate and/or other reliability of the decoding operation over that which is achieved with the current group, then the current group is removed or de-assigned from the demodulator elements and the survey group is substituted or assigned to the demodulation elements in place of the current group. As still another possibility, there may be instances where some but not all of the M demodulation elements are already assigned to respective paths, and the preferred embodiment addresses this possibility as well. For the unassigned demodulation elements, the assignment process is the same. Groups with M paths are examined which include a number of paths different than the ones already assigned with that number being at least equal to the number of unassigned demodulation elements.

In the preferred embodiment, the benefit analysis discussed above is made in response to comparisons of different determined values, where each such value is referred to in this document as a quality measure. The quality measure is a value measure for a group of paths, where the group for which the value measure is determined may take different forms. In one instance, the quality measure is made for the group consisting of the current paths. In other instances, the quality measure is made for a group that may replace the group of current paths; such a replacement group may consist solely of new paths or be a combination of one or more new paths with zero or more current paths. For each quality measure and as detailed below, it is based on two factors: (1) the different diversity, if any, with respect to all paths in the group being considered; and (2) the SNR (or other power measurement) of the group being considered. Each of these aspects is further appreciated given the discussion below of steps 48 through 58.

In step 48 demodulation element assignment block 27 determines, based on information received from demodulator 28 or SNR measurement block 26, whether there is a reason to de-assign any of the currently-assigned paths. For this reason, therefore, an output is shown in FIG. 2 from demodulator 28 to block 2. For example, a time tracking unit in demodulator 28 may determine that a corresponding path or paths no longer exist or that two or more paths have collapsed into one in which case two or more demodulation elements are assigned to the same path; in such events, receiver 20 may de-assign the one or more of the demodulation elements that were earlier assigned to the path(s) and label them free for a new assignment. As another example, this indication can be obtained based on a measurement from SNR measurement block 26 of the assumed assigned path. Other reasons for de-assignment may be ascertained by one skilled in the art. In any event, if a reason for de-assignment is detected, then method 32 continues to step 50 which de-assigns the path or paths identified for such action from the corresponding demodulation elements which are subsequently considered as free or inactive, and the flow continues with step 51.

In step 51 demodulation element assignment block 27 determines whether there are any survey groups currently existing for analysis. If not, then method 32 continues to step 64, which as described later merely completes the method. Further in this regard, note that an instance where no survey groups will exist at step 51 arises when no new paths are found by receiver 20. On the other hand, if one or more survey groups exists, method 32 continues to step 52.

In step 52, demodulation element assignment block 27 determines the quality measures for the current group followed by step 53 in which block 27 determines the quality measure for a survey group that arises when substituting one or more paths in place of one or more paths in the current group. To illustrate these concepts, consider the following two examples.

As a first example of the quality measure determination of step 52, assume that at a given time a demodulator with two elements is assigned to demodulate paths A and B. Next, assume there is an additional single new path C being considered. In response, step 52 determines a quality measure for the current group (i.e., A, B). Next, step 53 determines a quality measure for one of the two survey groups that would be identified in step 42 given the paths of the present example, where those two groups therefore consist of a first survey group of (A, C) (i.e., if new path C were substituted for current path B) and a second survey group of (B, C) (i.e., if new path C were substituted for current path A). Thus, in the present example, assume that this first instance of step 53 determines the quality measure for (A, C). As appreciated below, method 32 includes a circular operation due to a later step which in one embodiment causes step 53 to repeat for each different survey group identified in step 42. Thus, when step 53 is repeated a second time in the present example, step 53 determines the quality measure for (B, C).

As a second example of the quality measure determination of step 52, assume that at a given time a demodulator with two elements is currently assigned to demodulate paths D and E. Next, assume two new paths F and G are also considered for assignment. In response, step 52 determines a quality measure for the current group (i.e., (D, E)). Next, step 53 determines a quality measure for a survey group identified in step 42 but not yet considered by an earlier occurrence of step 53. Thus, in the present example, and if two demodulation element reassignments are allowed, then the survey groups identified by step 42 are (F, G), (F, D), (F, E), (G, D), and (G, E). If only one demodulation element reassignment is allowed, the survey group (F, G) is not identified by step 42 (because it would require assignment of two demodulation elements). Another option, which was previously discussed and it is further discussed later, is that if any of the above groups are MDO groups, only the one having the largest total path SNR is considered. In any event, step 53, again due to the circular flow introduced above, eventually determines a quality measure for each of these survey groups. Further, note that these measurements are made so that one of the groups may be possibly later selected for demodulation in a subsequent step of method 32 based on having a largest quality measure.

Having demonstrated the different groups for which the quality measure is made, attention is now directed to each such measurement. More particularly, recall that the quality measure of a group is based on the different diversity, if any, within a group and the SNR of the group. Second, note now that in the preferred embodiment, for each path in a group, the quality measure is the sum of the actual SNR of the path plus what will be referred to in this document as a "diversity value," where the diversity value is given in the same units as the SNR (e.g., dB) to provide a total in terms of those units. The diversity value is based on a perceived value or lack of value in one or more different identity parameters (i.e., which define respective diversities) for different paths in the group and is evaluated relative to all paths in a group. This aspect is further explored immediately below by applying it to the first examples provided above with respect to survey groups.

Recall in the first example of survey groups set forth above, step 52 measures the quality measure of the current group (i.e., (A, B)), and repeated occurrences of step 53 thereafter measure the quality measure for the two survey groups (i.e., (A, C) and (B, C)). Now, assume that paths A and B are both from the same antenna AT1B1 of base station BST1 in FIG. 1, while signal C is from antenna AT1B2 of base station BST2. Given the preceding, the step 52 quality measure of the current group adds the actual SNR of that group to any applicable diversity value given to the diversity represented by A and B. However, the only diversity of A and B is multipath diversity since they are transmitted by the same antenna and the same base station. For reasons more clear below, in the preferred embodiment multipath diversity is preferably given a reference diversity value of 0 dB. Thus, the quality measure for the group of (A, B) equals only the SNR of paths A and B. By way of an example to be used later, assume that path A has 2 dB SNR while path B has 4 dB SNR; thus, the quality measure of the current group of paths A and B equals 6 dB (i.e., 0+2+4=6 dB). Next, step 53 determines the quality measure of the first survey group consisting of (A, C). Here, there is base station diversity between these two paths, since path A is from base station BST1 while path C is from base station BST2. Thus, step 53 adds a diversity value given to this type of base station diversity to the SNR of paths A and C, with the result being the quality measure. For example, assume the diversity value given to such base station diversity equals 4 dB. Assume also that path C has an SNR of 3 dB. Thus, the quality measure for the survey group of (A,C) equals 9 dB (i.e., 4+2+3=9 dB). In a second occurrence, step 53 determines the quality measure of the second survey group consisting of (B, C). Here again there is base station diversity between these two paths, since path B is from base station BST1 while path C is from base station BST2. Thus, step 53 adds the base station diversity value to the SNR of paths B and C, with the result being the quality measure. Again assuming that the diversity value given to such base station diversity equals 4 dB and with the SNR assumptions above, then the quality measure for the survey group of (B, C) equals 11 dB (i.e., 4+4+3=11 dB).

Step 54 determines if the quality measure of the survey group determined in the preceding step 53 is greater than the quality measure of the current group. Thus, for the first example above relative to the survey groups of either (A, C) or (B, C), a first instance of step 54 compares the quality measure of (A, C) (i.e., 9 dB) to the quality measure of the current group (i.e., 6 dB), while a second instance of step 54 compares the quality measure of (B, C) (i.e., 11 dB) to the quality measure of the current group (i.e., 6 dB). For the present example, therefore, step 54 determines that the quality measures for both survey groups exceed that of the current group. Thus, for each of these occurrences of step 54, the flow continues to step 56. In step 56, the survey group having a quality measure higher than the current group is stored along with its corresponding quality measure. As a result in the present example, the survey group (A,C) is stored along with its 9 dB quality measure and the survey group (B, C) is stored along with its 11 dB quality measure. As detailed later, this storage step allows a consideration of the stored group for potential assignment of that group to the demodulation elements due to its relatively large quality measure. If survey group (A, C) is considered first for possible reassignment, its quality measure is stored first and method 32 continues with step 58, discussed later. After step 58, survey group (B, C) is also examined and its quality measure, being larger than the quality measure of the current group, is also stored in step 56. In addition, however, note that if step 54 determines that the quality measure of the current group is higher than that of the survey groups examined in step 53, then the flow continues directly to step 58 without a step 56 storage of a group and its quality measure.

Before proceeding, note that the preceding discussion of steps 54 and 56 prepares for a possible change in demodulation element assignment where the quality measure of a survey group exceeds the quality measure of the current group. However, in an alternative embodiments, a demodulation element reassignment caused by steps 54 and 56 could require more than a certain positive quality measure difference before a reassignment is made. This is known in the art as hysteresis and serves to avoid excessive reassignments caused by differences in the quality measure that are deemed to be insignificant for a reassignment to occur or caused by frequent back and forth changes in the quality measure of the groups. Thus, the comparison aspect of step 54 is more broadly stated that the flow is directed toward reassignment if a survey group has a quality measure that exceeds the quality measure of the current group by some positive dB value, e.g 3 dB, and where the magnitude of this value may be selected by one skilled in the art. In this manner, hysteresis is effectively applied in steps 54 and 56, that is, where step 54 requires that the quality measure for the survey group at issue is larger than that of the current group by a certain quality measure value in order for a reassignment to occur. Hysteresis may be used because each time a re-assignment occurs, the corresponding demodulation element does not participate in the communication for a non-zero time period. The quality measure threshold value for re-assignment is chosen to optimize the tradeoff between the idle period of the demodulation element and the increased quality measure that the new path offers. Moreover, more than one demodulation element can be allowed reassignment. In that case, the effective quality measure threshold value for re-assignment can be different for each re-assignment (for example, the quality measure threshold for the second re-assignment may be larger than the quality measure threshold for the first re-assignment, etc.).

In step 58, demodulation element assignment block 27 determines whether there are any remaining survey groups that have not yet been considered. If such groups are remaining, as in the case of group (B, C) after group (A, C) is examined, then the flow continues to step 60 which advances the flow to consider the next survey group, after which the flow returns to step 53. As a result, when step 53 is again reached, the next survey group is considered according to the steps described above. From the preceding circular flow, at some point all survey groups are considered and this state will be detected by step 58 and the flow passes to step 62. For the present example, this will be the case after both groups (A, C) and (B, C) have been examined.

In step 62, if one or more survey groups were stored by earlier instances of step 56 by virtue of having quality measures that exceeded the threshold of step 54, then in step 60 the one of those survey groups with the largest quality measure is assigned to the demodulator in place of the current group. For example, suppose when step 62 is reached that the survey groups of (A, C) having a 9 dB quality measure and the survey group of (B, C) having an 11 dB quality measure are both stored, and the current group is (A, B). As a result in step 62, the group of (B, C), having the highest quality measure of the stored survey groups, replaces the current group of (A, B); in effect, therefore, path A is dropped and path C is added in its place. In addition, note therefore that the replaced path(s) now becomes a new survey group and joins all other unassigned survey groups. Thereafter, method 32 continues to step 64, and step 64 merely represents completion of method 32. One skilled in the art should therefore realize that at such completion all survey groups will have been considered, with potentially one or more such groups stored for potential reassignment during the process, followed by an assignment of the one of those groups with the highest relative quality measure to be assigned to the elements of demodulator 28. In addition, note that if no survey group was stored by step 56 (i.e., if the current group had a better quality measurement than all considered survey groups), then no reassignment occurs in step 62 and, hence, the current group continues to be demodulated by demodulator 28. Finally, note that once method 32 is complete, it will later start over once a newly-diverse path is received by receiver 20.

Having detailed method 32 but to demonstrate further the operation of the preferred embodiment, an additional example of the operation of steps 52 and 54 is now presented by returning to the example of survey groups set forth above where the current group consists of (A, B) and the two survey groups consist of either (A, C) or (B, C); however, the SNR and diversity values are now changed to demonstrate another aspect of the preferred embodiment. In the present example, assume the same diversity and, thus, paths A and B are both from the same antenna AT1B1 of base station BST1 while path C is from antenna AT1B2 of base station BST2. Changing the numeric assumptions, however, assume that path A has 8 dB SNR while path B has 10 dB SNR; thus, the quality measure of the current group equals 18 dB (i.e., 0+8+10=18 dB). Further, assume that path C has an SNR of 2 dB and that base station diversity is given a diversity value of 3 dB. In response to these assumptions, the two instances of step 53 determine a quality measure of the first survey group (i.e., A, C) of 13 dB (i.e., 8+2+3=13 dB) and of the second survey group (i.e., B, C) of 15 dB (i.e., 10+2+3=15 dB). Further, each following inquiry of step 54 is found to be negative, that is, neither of the quality measures of the survey groups exceeds that of the current group. In response, in both cases the flow does not go to step 56 and no survey group is stored. Instead, the flow continues through step 58 to step 62, but no reassignment takes place because no survey group was stored. Accordingly, this example demonstrates that while base station diversity is considered as a factor for purposes of reassignment, it is only one factor that may affect such reassignment and it does not pre-empt all other considerations. Specifically, in the present example, the current group of (A, B) consists only of paths that differ as multipaths, that is, they have all the same identity parameters (e.g., base station BST1, antenna AT1B1). However, both of the survey groups have base station diversity. Nonetheless, after each occurrence of step 53, it is determined by step 54 that notwithstanding this base station diversity, it is not desired to store the survey group and it is therefore later determined by step 62 that it is not desired to reassign a base station diverse group to a demodulation element because the overall quality measure will not be improved by such a reassignment.

The preceding discussion demonstrates the preferred embodiment aspect of diversity values, and demonstrates that such values represent a score given to a potential change which could occur when substituting one or more new paths in place of one or more current paths. From these aspects and having detailed the preferred embodiment aspect of a diversity value for use in the quality measurement evaluation, several additional observations are further explored below.

As a first additional observation in view of method 32, in the preferred embodiment, the actual SNR gain number assigned to each diversity value may be determined using various techniques. For example, the communication quality improvement (e.g., reduced frame error rate) that each type of diversity provides can be predetermined either through simulation or through actual measurements for the applications of interest (environment, speed, etc.) and be assigned a particular SNR value. For example, assigning to a demodulation element a path from a different receiver antenna (and/or base station, etc.) rather than another path from the same receiver antenna (and/or base station, etc.) may be preferable if the SNR of the latter path is, for example, 4 dB or less larger than the SNR of the former. In that case, the diversity value offered by the different receiver antenna is equivalent to 4 dB and, thus, the gain in the diversity value is 4 dB. This particular diversity dB value is added to the actual SNRs of the paths in each group to determine the quality measure of the group. Note further that if a particular diversity is perceived as a poor tradeoff, then its diversity value may be a value of negative dB. For example, if paths received by different antennas have non-zero correlation, then assigning both of these paths will add a negative dB value to the final quality measure because of diminished diversity. This negative dB value may depend on the degree of correlation as well as the SNR of the paths. Moreover, if multipaths having the same forms of diversity (other than time diversity) also have nonzero correlation, then a negative dB value should also be added to their combination to reflect the reduced diversity gains. Therefore, for a group containing two correlated multipaths, the quality measure may be equal to the sum of the path SNRs plus the negative dB value due to the path correlation. The larger the correlation among paths, the larger the loss from diminished diversity. Further, this negative dB value also may depend on the degree of correlation as well as the SNR of the paths.

As a second additional observation in view of method 32, while the preceding examples assume only a single change in diversity, namely, base station diversity, the preferred embodiment contemplates numerous different types of diversity. Therefore, when a change from an assigned path to a new path is considered, then the diversity value for each different change in diversity type is preferably considered. Thus, if a path is diverse with respect to another path or paths in the group by virtue of different identity parameters, then the diversity value for each of those identity parameters is added to the actual SNR of the paths in the group to determine the quality measure of the group. Still further, notice that the quality measure gain offered by a combination of different diversity values, for example both receive antenna and base station diversity exist, may be different (smaller or larger) than the sum of the diversity value if only each diversity form was considered alone.

As a third additional observation in view of method 32, note that the preceding examples generally depict the case where all M demodulation elements are available for reassignment (i.e., K=M). However, in some cases it may be that K is less than M. In this alternative, then step 42 should determine the survey groups in view of the lesser number of available demodulation elements, where method 32 will then otherwise perform in the same manner as described above. In the preferred embodiment, the only additional difference will be that the combination survey groups considered should not be permitted to exclude the path or paths that cannot be re-assigned. For example, assume the demodulator has two demodulation elements, and that the current paths are paths A and B. Assume further that only one of the two demodulation elements can be reassigned at one time, and that paths C and D also exist for possible assignment. As a result, the survey groups will only include (A, C), (A, D), (B, C) and (B, D), and will not include (C, D). Thus, the quality measures of these groups are then compared to the quality measure for the current group of (A, B), and the remainder of method 32 operates as described above. Moreover, if for some reason path A in particular is not allowed reassignment at a particular time, the survey groups are only (A, C) and (A, D).

As a fourth additional observation in view of method 32, while the preceding approach provides an improved assignment of paths to demodulation elements, in an alternative embodiment the approach is further improved to reduce the number of required quality measurement determinations. More particularly, recall in the case of MDO survey groups that the groups differ only in mulitpath diversity. Given this classification, note now that an alternative embodiment may be formed by modifying step 53 accordingly. Specifically, for MDO survey groups, step 53 is modified so that the quality measurement is made only for the survey group that includes the multipath with the highest SNR. Next, the flow continues to step 54. Given this modification, note that the remaining MDO survey groups need not be considered for assignment since they will not result in a larger quality measure than the MDO survey group containing the strongest multipath.

The concept of MDO survey groups also may be used to reduce the number of survey groups that are considered in step 53 in the case when the current group assigned to the demodulation elements is an MDO survey group, that is, when all current paths are multipaths with respect to one another. In this case, step 53 is modified so that the quality measurement is made only for the current group and the survey group using the combination of strongest MDO paths. If a reassignment cannot be made for that survey group, the remaining MDO survey groups considering replacing the current group should not be examined. In general, this holds true for combinations of weaker MDO paths and combinations of stonger MDO paths (in terms of aggregate actual SNR), if more than one demodulation elements reassignments are considered.

As a fifth additional observation in view of method 32, and recalling that step 52 determines the quality measure for the current group, note further that method 32 will therefore necessarily accommodate an instance where one or more of the demodulation elements is not currently assigned. For example, suppose that at a given time a two-element demodulator has one unassigned element, and its other element (i.e., the assigned element) is demodulating a path T. Next, assume two paths U and V are also considered for assignment In response, step 52 determines a quality measure for the current group which only consists of T. Since T alone has no diversity (i.e., because there are no other paths in the current group), then its quality measure will equal only its SNR. However, if two demodulation element reassignments are allowed, the survey groups are (T,U), (T,V), and (U,V). Thus, for each of the survey groups, some type of diversity will appear simply because each group has more than one path. Accordingly, it is almost certain that the quality measure for each new group will exceed that of the current group because each new group has two paths instead of one (and, thus, two added SNR values), and due further due to the value, if any, given the diversity of the new groups since they have more paths. As a result, step 56 will store any group having a higher quality measure and, thereafter, if no other groups are reviewed or have higher quality measures, then a new group assignment is made and which therefore uses all of the demodulation elements rather than leaving one or more unused as was the case when the current group (of path T) was first analyzed.

From the above, it may be appreciated that the above embodiments provide an improved method and apparatus for assigning paths to demodulation elements in a spread spectrum receiver. Moreover, while the present embodiments have been described in detail, various substitutions, modifications or alterations could be made to the descriptions set forth above without departing from the inventive scope, where various examples have been set forth above. Indeed, as other examples, while the preferred embodiment has been shown in the CDMA environment, the present inventive teachings may apply to other spread spectrum communication systems. As another example, while receiver 20 has been shown to include certain blocks for performing known functions, other comparable types of blocks and functions could be used in the place of these blocks. As still another example, the preferred embodiment may be implemented in either a user or base station receiver. Still other examples will be ascertainable by one skilled in the art. For these reasons, therefore, the preceding examples are shown as preferred embodiments, but are not intended to restrict the inventive scope as is defined by the following claims.

What is claimed is:

1. A method of operating a spread spectrum communications receiver, comprising the steps of:
   demodulating a current path group with a demodulator;
      wherein the current path group comprises one or more current paths; and
      wherein the demodulating step comprises demodulating the one or more current paths with a respective one more demodulation elements;
   determining one or more survey groups at the receiver, wherein each survey group comprises a unique combination of one or more new paths and zero or more current paths;
   determining a quality measure of the current path group;
   determining a quality measure of the one or more survey groups;
   selectively assigning a selected one of the one or more survey groups to respective elements of the demodulator in place of the current path group in response to a comparison of the quality measure of the selected one of the survey groups with the quality measure of the current path group; and
   wherein the quality measure is responsive to a power of each path in a group and multiple forms of diversity within a group.

2. The method of claim 1 wherein the power comprises a signal-to-noise ratio.

3. The method of claim 2 wherein the multiple forms of diversity comprise base station diversity.

4. The method of claim 3 wherein the multiple forms of diversity further comprise diversity selected from a group consisting of transmitter antenna diversity, receiver antenna diversity, angle diversity, code diversity, and frequency diversity.

5. The method of claim 1 wherein the multiple forms of diversity comprise base station diversity.

6. The method of claim 5 wherein the multiple forms of diversity further comprise diversity selected from a group consisting of transmitter antenna diversity, receiver antenna diversity, angle diversity, code diversity, and frequency diversity.

7. The method of claim 1 wherein the comparison determines whether the quality measure of the selected one of the one or more survey groups exceeds the quality measure of the current path group.

8. The method of claim 1 wherein the comparison determines whether the quality measure of the selected one of the one or more survey groups exceeds the quality measure of the current path group by a hysteresis threshold.

9. The method of claim 1 wherein the quality measure is responsive to a sum of the power of each path in a group and a value given to one or more of the multiple forms of diversity within a group.

10. The method of claim 9:
    wherein a first path is received by the receiver at a first receiver antenna and has a first power;
    wherein a second path is received by the receiver at a second receiver antenna forming receiver antenna diversity and has a non-zero correlation relative to the first path and a second power; and
    wherein a diversity value for a group comprising the first path and the second path is a negative value in response to the non-zero correlation, the first power, and the second power.

11. The method of claim 9:
    wherein a first path has a multipath diversity relative to a second path and has a non-zero correlation relative to the first path;
    wherein the first path has a first power and the second path has a second power and
    wherein a diversity value for a group comprising the first path and the second path is a negative value in response to the non-zero correlation, the first power, and the second power.

12. The method of claim 1:
    wherein the one or more survey groups include a plurality of multipath-diverse-only groups having paths that differ from one another only with respect to multipath diversity; and
    wherein the step of determining a quality measure of the one or more survey groups comprises determining a quality measure of only a multipath-diverse-only group having a largest value of the power within the plurality of multipath-diverse-only survey groups.

13. The method of claim 1 and further comprising the steps of:
    forming estimated information data by demodulating paths in the selected one of the one or more survey groups with respective elements of the demodulator; and
    decoding the estimated information data.

14. The method of claim 1 wherein the current path group and the one or more survey groups comprise CDMA paths.

15. The method of claim 1 and further comprising the step of, for each of the one or more new paths and prior to the step of determining a quality measure of the one or more survey groups, identifying any identity parameters for the new path, wherein an identity parameter relates to a diversity of the path relative to another path.

16. The method of claim 1 and further comprising the step of despreading each path in the current group and in the one or more survey groups prior to the step of determining a quality measure of the one or more survey groups.

17. The method of claim 1 wherein the receiver comprises a cellular communications receiver.

18. The method of claim 1 and further comprising the steps of, for each path in the current path group and in the one or more survey groups:
    despreading the one or more new paths; and
    identifying any identity parameters for the one or more new paths, wherein an identity parameter relates to a diversity of the path relative to another path.

19. The method of claim 1:

wherein the multiple forms of diversity further comprise diversity selected from a group consisting of base station diversity, transmitter antenna diversity, receiver antenna diversity, angle diversity, code diversity, and frequency diversity;

wherein the comparison determines whether the quality measure of the selected one of the survey groups exceeds the quality measure of the current path group; and wherein the quality measure is responsive to a sum of the power and a value given to one or more of the multiple forms of diversity within a group.

20. The method of claim 1 wherein the step of determining one or more survey groups at the receiver comprises determining a survey group for effectively re-assigning only one element of the demodulator by determining a survey group comprising all paths of the current path group except one path in the current path group.

21. The method of claim 1:

wherein each of the steps of determining a quality measure determines the quality measure in response to one or more identity parameters corresponding to one or more paths in a group for which the quality measure is determined; and wherein each of the one or more identity parameters has a predetermined individual diversity value.

22. The method of claim 21 wherein for a group for which the quality measure is determined and having two or more paths having different identity parameters, a combination of the two or more of the identity parameters has a combined predetermined diversity value differing from a total of the individual diversity value for each identity parameter in the combination.

23. The method of claim 1 wherein the step of selectively assigning a selected one of the one or more survey groups to respective elements of the demodulator in place of the current path group selects a survey group from the one or more survey groups having a quality measure larger than a quality measure for each of the other of the one or more survey groups and larger than a quality measure of the current path group.

24. A communications receiver, comprising:

circuitry for demodulating a current path group;
   wherein the current path group comprises one or more current paths; and
   wherein the demodulating step comprises demodulating the one or more current paths with a respective one more demodulation elements;

circuitry for receiving one or more survey groups at the receiver, wherein each survey group comprises a unique combination of one or more new paths and zero or more current paths;

circuitry for determining a quality measure of the current path group;

circuitry for determining a quality measure of one or more survey groups, circuitry for selectively assigning a selected one of the survey groups to respective elements of the demodulator in place of the current path group in response to a comparison of the quality measure of the selected one of the survey groups with the quality measure of the current path group; and wherein the quality measure is responsive to a power of each path in a group and multiple forms of diversity within a group.

25. The receiver of claim 24 wherein the power comprises a signal-to-noise ratio.

26. The receiver of claim 24 wherein the multiple forms of diversity comprise base station diversity.

27. The receiver of claim 26 wherein the multiple forms of diversity further comprise diversity selected from a group consisting of transmitter antenna diversity, receiver antenna diversity, angle diversity, code diversity, and frequency diversity.

\* \* \* \* \*